US008682131B2

(12) United States Patent
Seo et al.

(10) Patent No.: US 8,682,131 B2
(45) Date of Patent: Mar. 25, 2014

(54) RECORDING MEDIUM, METHOD OF CREATING FILE OF THE RECORDING MEDIUM, AND METHOD AND APPARATUS FOR REPRODUCING THE SAME (75) Inventors: Kang Soo Seo, Anyang-si (KR); Byung Jin Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 2118 days.

(21) Appl. No.: 11/520,008

(22) Filed: Sep. 13, 2006

(65) Prior Publication Data

US 2007/0009239 A1 Jan. 11, 2007

Related U.S. Application Data (62) Division of application No. 11/007,289, filed on Dec. 9, 2004, now Pat. No. 7,747,131.

(30) Foreign Application Priority Data

Dec. 11, 2003 (KR) .......................... 10-2003-0090094

(51) Int. Cl.
*H04N 5/765* (2006.01)
*H04N 5/931* (2006.01)

(52) U.S. Cl.
USPC ............................................ 386/200; 386/204

(58) Field of Classification Search
None
See application file for complete search history.

(56) References Cited

U.S. PATENT DOCUMENTS

| 6,263,344 | B1 * | 7/2001 | Wu et al. ............................... 1/1 |
| 6,697,969 | B1 | 2/2004 | Merriam |
| 6,895,171 | B1 | 5/2005 | Taira et al. |
| 7,764,868 | B2 * | 7/2010 | Okada et al. .................... 386/241 |
| 2001/0010757 | A1 * | 8/2001 | Mori et al. ........................ 386/98 |
| 2002/0135608 | A1 | 9/2002 | Hamada et al. |
| 2002/0165970 | A1 | 11/2002 | Ludewig |
| 2003/0049017 | A1 * | 3/2003 | Chung et al. .................... 386/95 |
| 2004/0252974 | A1 * | 12/2004 | Sugimura et al. ............... 386/95 |

FOREIGN PATENT DOCUMENTS

KR 10-0271258 8/2000

OTHER PUBLICATIONS

Office Action for Korean patent application No. 10-2003-0090094 dated Jun. 26, 2010.

* cited by examiner

*Primary Examiner* — William C Vaughn, Jr.
*Assistant Examiner* — Oluwaseun A Adegeye
(74) *Attorney, Agent, or Firm* — Harness, Dickey & Pierce, P.L.C.

(57) ABSTRACT

A recording medium, a method of creating a file of the recording medium, and a method and apparatus for reproducing the same are disclosed, wherein position change and transition of random playback points among title recorded within the recording medium can be easily performed, thereby providing an apparatus having more convenient title playback functions to the users. The method of creating a file of the recording medium includes forming a PlayList file including playback control information of a set of recorded data, forming an object file including an execute command of the PlayList file, and forming an index file including a set of Normal Title information designating a specific object within the object file, and a set of auxiliary Title information designating a random point of data being reproduced by the Normal Title information.

9 Claims, 7 Drawing Sheets

RECORDING MEDIUM, METHOD OF CREATING FILE OF THE RECORDING MEDIUM, AND METHOD AND APPARATUS FOR REPRODUCING THE SAME

This application is a continuation of U.S. application Ser. No. 11/007,289, filed Dec. 9, 2004 now U.S. Pat. No. 7,747,131, the entirety of which hereby is incorporated herein by reference.

FOREIGN PRIORITY INFORMATION

This application claims the benefit of the Korean Patent Application No. 10-2003-0090094, filed on Dec. 11, 2003, the entirety of which hereby is incorporated herein by reference.

BACKGROUND OF THE INVENTION

1. Field of the Invention

The present invention relates to a recording medium, and more particularly, to a recording medium, a method of creating a file of the recording medium, and a method and apparatus for reproducing the same.

2. Discussion of the Related Art

Optical discs are widely used as a recording medium for recording mass data. Presently, among a wide range of optical discs, a new high density optical recording medium, such as a blu-ray disc (hereinafter referred to as "BD"), is under development for recording (or writing) and storing high definition video and audio data for a long period of time. Currently, an optical recording and/or reproducing apparatus for recording and/or reproducing the blu-ray disc (BD), which is known to be the next generation recording medium technology, is under development as a next generation optical recording solution that is capable of having data significantly surpassing the conventional DVD, along with many other digital apparatuses.

More specifically, in order to reproduce data recorded within the above-described blu-ray disc (BD), a systematic set of file information (or file structure) for controlling data and, also, controlling a method of reproducing data should be provided. However, in the current blu-ray discs (BDs), a preferable method for creating the file information has not yet been proposed, and so there lies many limitations in developing a blu-ray disc (BD)-based optical recording and/or reproducing apparatus. And eventually, such limitations lead to difficulty in reproducing the data recorded within the blu-ray disc (BD) by using various methods, and in reproducing the recorded data in accordance with the users' demands.

SUMMARY OF THE INVENTION

Accordingly, the present invention is directed to a recording medium, a method of creating a file of the recording medium, and a method and apparatus for reproducing the same that substantially obviate one or more problems due to limitations and disadvantages of the related art.

An object of the present invention is to provide a recording medium, a method of creating a file of the recording medium, and a method and apparatus for reproducing the same, wherein file information for controlling data recorded within the recording medium are newly defined, and more specifically, wherein systematized index files and object files are provided.

Another object of the present invention is to provide a recording medium, a method of creating a file of the recording medium, and a method and apparatus for reproducing the same, wherein, when playing-back a plurality of titles that are recorded within the recording medium, a plurality of sets of auxiliary Title information are included within an index file, thereby enabling transition between titles to be carried out at a random point.

A further object of the present invention is to provide a method and apparatus for reproducing a recording medium with more efficiency by using the newly created file information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of creating a file for a recording medium includes forming a PlayList file including playback control information of a set of recorded data, forming an object file including an execute command of the PlayList file, and forming an index file including a set of Normal Title information designating a specific object within the object file, and a set of auxiliary Title information designating a random point of data being reproduced by the Normal Title information.

In another aspect of the present invention, a method of creating a file for a recording medium includes forming an index file for playing-back at least two titles within the recording medium including the at least two titles, wherein the index file includes a plurality of sets of Normal Title information, wherein each set of the Normal Title information is in a one-to-one correspondence with each of the at least two titles recorded within the recording medium, and at least one set of auxiliary Title information enabling playback of another title to be performed starting from a random point of the title, while playing-back a specific title by using a specific set of the Normal Title information.

In another aspect of the present invention, a recording medium includes a stream area having at least two titles recorded therein, and a file recording area having an index file for playing-back the at least two titles, wherein the index file includes a plurality of sets of Normal Title information, wherein each set of the Normal Title information is in a one-to-one correspondence with each of the at least two titles recorded within the recording medium, and at least one set of auxiliary Title information enabling playback of another title to be performed starting from a random point of the title, while playing-back a specific title by using a specific set of the Normal Title information.

In another aspect of the present invention, a method for reproducing a recording medium includes playing-back a first title by using a set of Normal Title information, and shifting to a random point of a second title by using a set of auxiliary Title information, during the playback of the first title, thereby reproducing the second title starting from a corresponding shifted point of the second title.

In a further aspect of the present invention, an apparatus for reproducing a recording medium includes an optical recording and/or reproducing unit playing-back at least one title recorded within a stream area of the recording medium, and reading a set of Normal Title information and a set of auxiliary Title information recorded within a file recording area of the recording medium, and a controller controlling the optical recording and/or reproducing unit, so as to play-back one of the titles recorded within the recording medium by using the Normal Title information, and to play-back another title starting from a random point by using the auxiliary Title information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, the optical disc and, more specifically, the "blu-ray disc (BD)" will be given as an example of the recording medium proposed herein. However, it will be apparent that the spirit or scope of the present invention may be equally applied to other types of recording medium.

Figure 1:
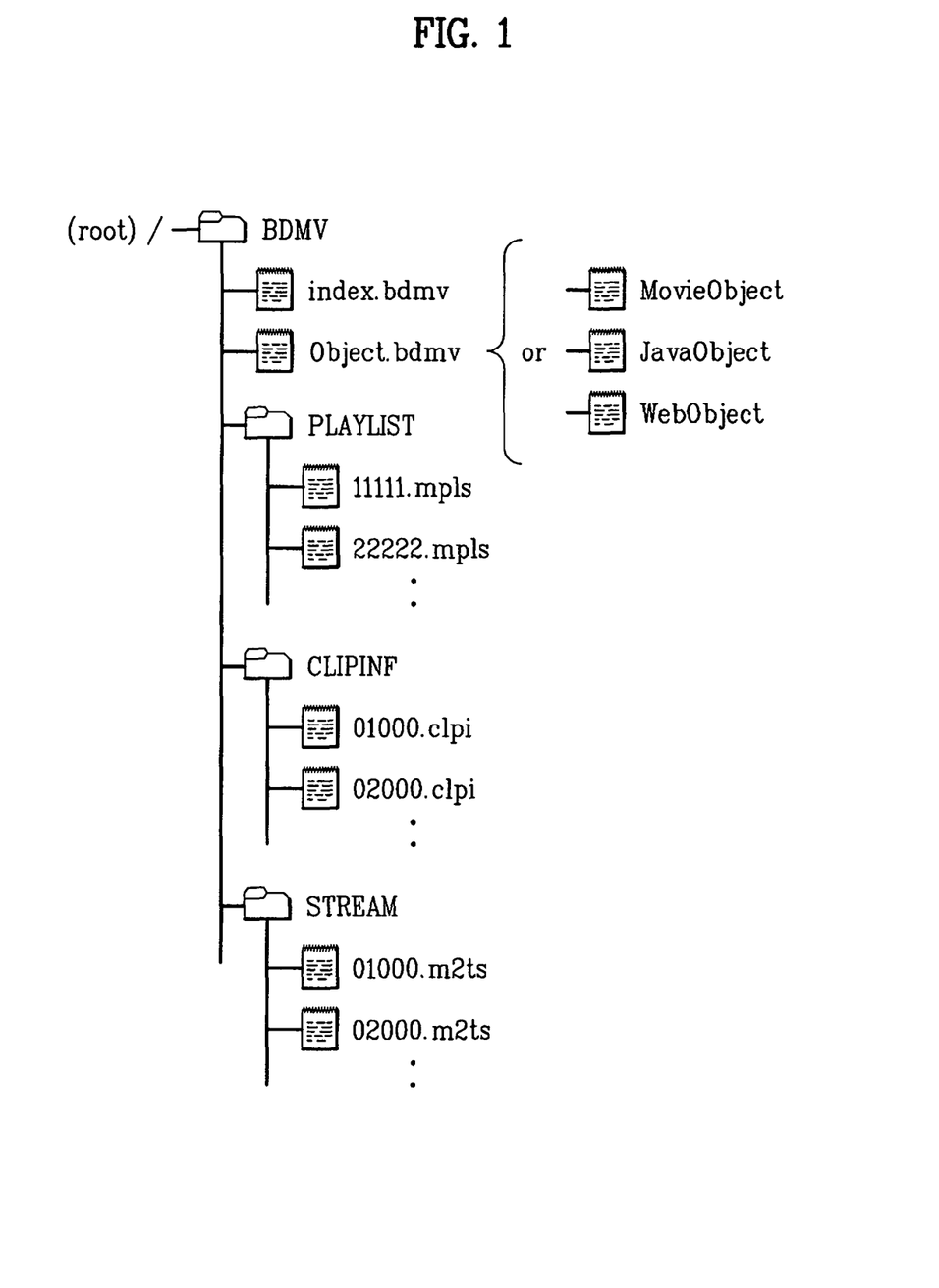
FIG. 1 illustrates a file structure being recorded on an optical disc, the optical disc being a recording medium, according to the present invention.
Figure 2:
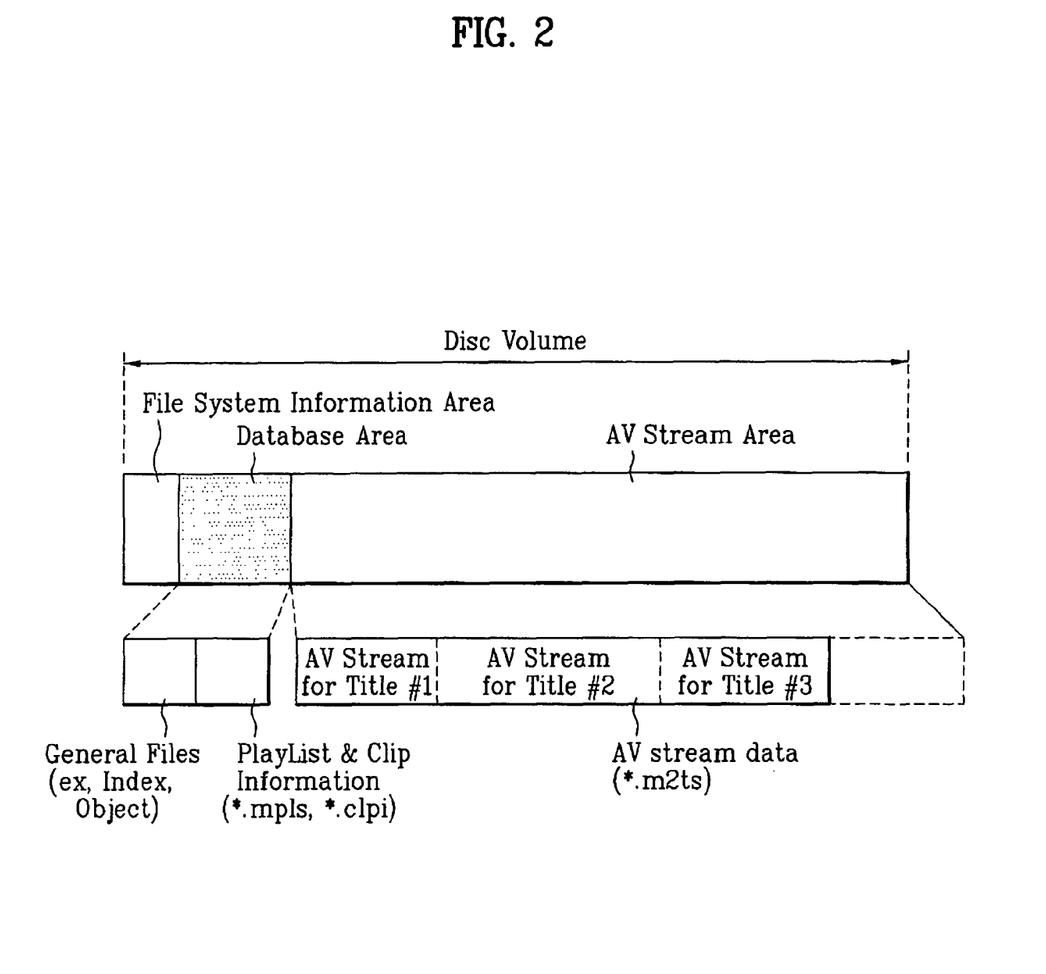
FIG. 2 illustrates a data recording structure being recorded on the optical disc, the optical disc being the recording medium, according to the present invention.

FIGS. 1 and 2 respectively illustrate a file structure and a data recorded structure being recorded within an optical disc according to the present invention, wherein the optical disc is a recording medium. More specifically, FIG. 1 illustrates a file structure controlling stream data recorded within the optical disc according to the present invention, wherein the optical disc is a recording medium. Herein, at least one BD directory (BDMV) is included in a root directory (root). Each BD directory includes an index file (index.bdmv) and an object file (MovieObject.bdmv), which represent general files that are used when interacting with one or more users. For example, the index file contains data representing an index table which includes diverse information regarding a plurality of selectable menus and titles.

Each BD directory includes three file directories including data to be reproduced, and information required for reproducing the data. The file directories included in each BD directory are a stream directory (STREAM), a playlist directory (PLAYLIST), and a clip information directory (CLIPINF). The index file and the object file being the general files, which are more closely related to the present invention, will be described in detail in a later process.

The stream directory includes audio/video (AV) stream (hereinafter referred to as "AV stream") files. More specifically, the stream files (01000.m2ts, 02000.m2ts) may generally be in the form of MPEG2 transport packets and be named as "*.m2ts". Further, the clip information directory (CLIPINF) includes clip information files (01000.clpi, 02000.clpi) being in one-to-one correspondence with the stream files (*.m2ts) included in the stream directory. A clip information file (*.clpi) records property information and timing information of a corresponding stream file (*.m2ts), wherein the timing information includes mapping information that maps presentation time stamp (PTS) with source packet number (SPN) using entry point map. In the BD standard, each pair of a stream file (*.m2ts) and its corresponding clip information file (*.clpi), which are in one-to-one correspondence with one another, is designated as a clip. For example, 01000.clpi included in CLIPINF includes the property and timing information of 01000.m2ts included in STREAM, and 01000.clpi and 01000.m2ts form a clip.

Referring back to FIG. 1, the playlist directory (PLAYLIST) includes one or more PlayList files (*.mpls), wherein each PlayList file (*.mpls) includes at least one PlayItem which designates playing interval for a specific original clip. More specifically, a PlayItem includes information designating presentation start and presentation end times (IN-Time and OUT-Time) for reproduction of a specific original clip, which may be designated by clip_Information_File_name within the PlayItem. Accordingly, a PlayList file (*.mpls) represents a basic playback control file for playing-back a desired clip from a combination of one or more PlayItems.

Moreover, the above-described BD directory (BDMV) includes an index file (index.bdmv) and an object file (object.bdmv), which are general files for ensuring user interactivity. Most particularly, at least one of a plurality of title information that can be selected by the user is provided in the index file (index.bdmv). And, the object file (object.bdmv) file includes a plurality of objects (OBJ), wherein each of the objects (OBJ) includes a PlayList file playback command (e.g., Play PlayList), which is associated with a playback of the specific title. Accordingly, at least one of the object files (Object.bdmv) is provided in the present invention. And, in case a plurality of object modes is provided depending upon the attributes of the data, the object files (Object.bdmv) may include a movie object file (MovieObject.file), a Java object file (JavaObject.file), and a web object file (WebObject.file).

Also, when creating the index file according to the present invention, the index file includes different types of title information, such as Normal Title information and auxiliary Title information. More specifically, the Normal Title information can be recognized by the user, and the auxiliary Title information supplements the Normal Title information but is not recognized by the user. The Normal Title information and the auxiliary Title information will be described in detail in FIG. 3A to FIG. 6. Accordingly, newly creating file information according to the present invention refers to systematizing (or organizing) the association between the files (i.e., index file, Object file, PlayList file, ClipInfo file, and stream files) included within the file structure, and to newly define the information included within the file, so as to support a specific playback method.

FIG. 2 illustrates information corresponding to the file structure being recorded within the optical disc. Starting from the inner circumference (or center) of the optical disc, the disc volume includes a file system information area occupying the inmost portion of the disc volume, an AV stream area occupying the outmost portion of the disc volume, and a database area occupied between the file system information area and the stream data area. In the file system information area, system information for controlling the entire data files is recorded. And, actual stream data such as audio/video/graphic data are recorded in the AV stream area. The PlayList files, clip information files, and general files, such as the index file (index.bdmv) and the object file (object.bdmv), are recorded in the database area of the disc volume. Therefore, the user uses the file information included in the database area, so as to select a desired AV stream and to play-back the selected and desired AV stream.

Figure 3A:
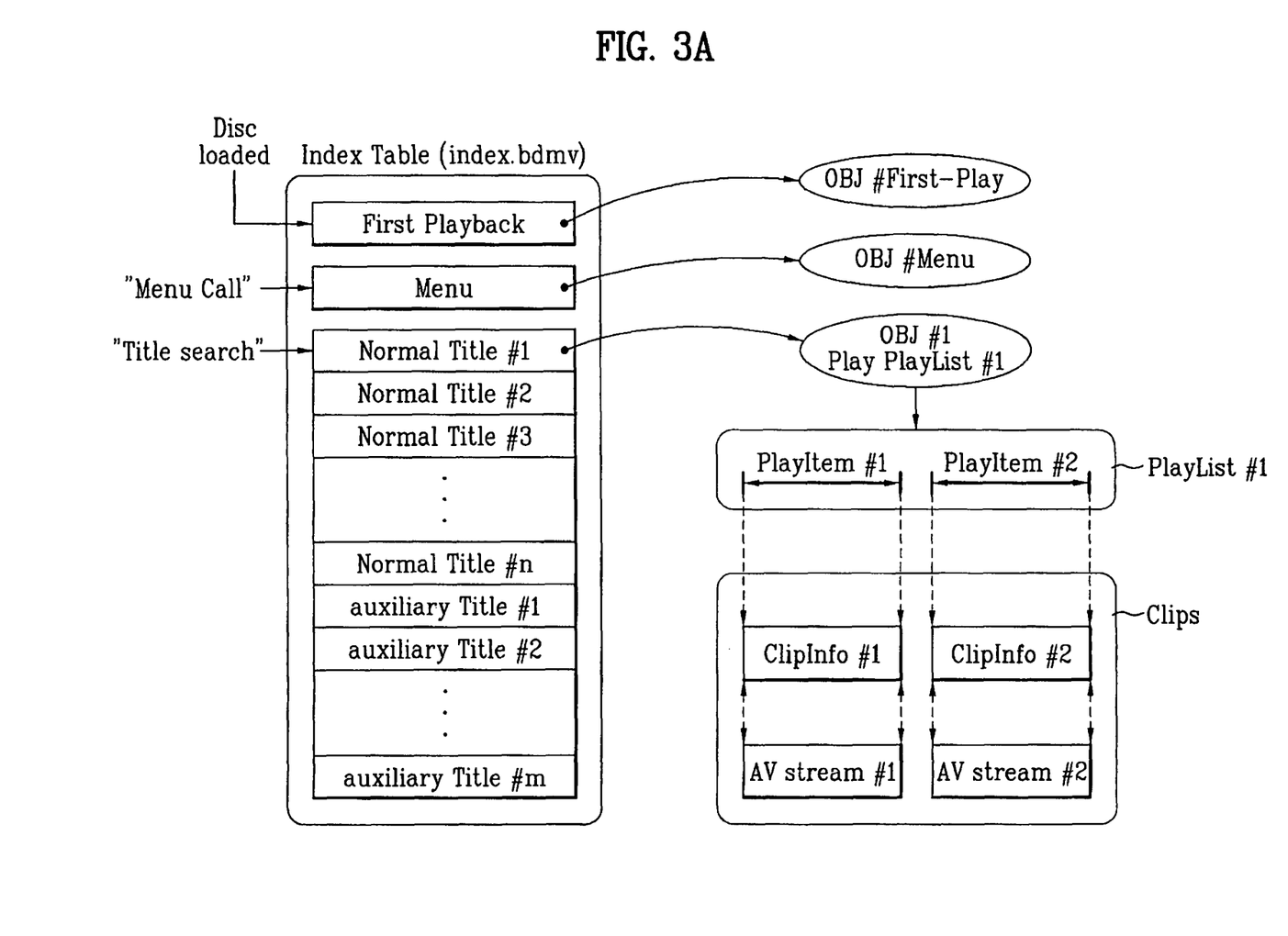
FIGS. 3A and 3B illustrate general views of a file structure that is recorded within an optical disc according to the present invention, the optical disc being a recording medium, and, more particularly, of a Normal Title and an auxiliary Title according to the present invention.
Figure 3B:
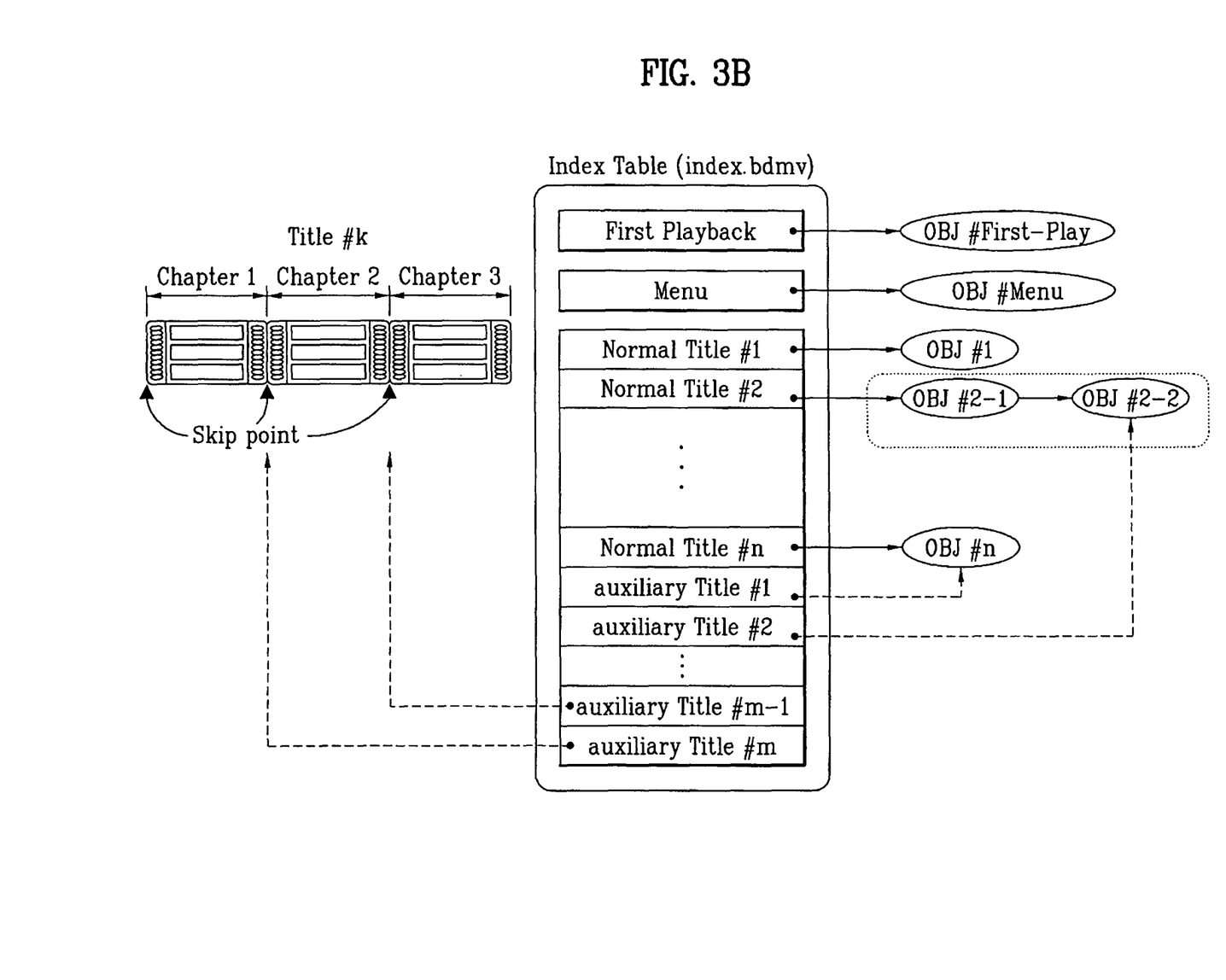

FIGS. 3A and 3B illustrate examples of the method of creating files according to the present invention. Most particularly, FIGS. 3A and 3B illustrate interaction between the files based on the index file (index.bdmv) and the object file (object.bdmv). Accordingly, FIG. 3A illustrates the structure of an index file (index.bdmv) and a hierarchical structure of the entire file information using a specific Normal Title information. FIG. 3B illustrates various applications of the Normal Title information and the auxiliary Title information within the index file (index.bdmv).

Referring to FIG. 3A, the index file (index.bdmv) consists of an index table, and the index table includes title information, menu information, and first playback information. The sets of information included in the index table are respectively linked with a corresponding specific object (OBJ) within the object file (Object.bdmv). More specifically, for example, Normal Title #1 information within the index file includes object identification information (OBJ_id), corresponds to the Normal Title #1 information. In addition, the Normal Title information within the index table is provided to the user through a "Title search" command from the user or a title menu included in the menu information.

Therefore, for example, when the user selects Title #1 among a plurality of titles that is provided, an object #1 (OBJ #1) command is executed. Herein, object #1 (OBJ #1) is designated by Normal Title #1. The command includes an execute command of PlayList #1 (e.g., Play PlayList #1). Therefore, when object #1 (OBJ #1) executes PlayList #1, the clip including stream files related to the actual Title #1 is played-back due to the functions and operations of the PlayList file shown in FIG. 1. Moreover, a user's "Menu Call" command executes the menu information included in the index table. And, the menu information includes link information (OBJ_id), which automatically connects the menu information to a specific object (OBJ #Menu). Furthermore, the first playback information included in the index table includes link information (OBJ_id), which automatically connects the first playback information to a specific object (OBJ #First-Play).

As described above, in the file structure according to the present invention, when executing the Normal Title information, a specific object (e.g., OBJ #First-Play, OBJ #Menu, and OBJ #1) is automatically executed. And, the specific object includes a playback command (i.e., Play PlayList) of the specific PlayList. Therefore, in the file structure, as the clip file that is designated by at least on PlayItem included within the corresponding PlayList file is executed, the AV stream data corresponding to the title is reproduced. Therefore, the hierarchical file structure refers to a structure of the object, the PlayList, and the clip being automatically executed in series (i.e., in the order of object→PlayList→clip) in a later process, after the user selects the Normal Title information.

The index file according to the present invention includes Normal Title information and auxiliary Title information. When compared with the Normal Title information, the auxiliary Title information may be described to have three main attributes. First of all, the Normal Title information can be recognized by the user, and therefore, a user operation command (also referred to as a "user operation (UO)") executes a specific title. Although the auxiliary Title information is included in the index file, the auxiliary Title information cannot be recognized by the user and is automatically executed by the system (or program). However, in some particular cases, the auxiliary Title information may be formed so as to be executed by the UO command, which will be described in detail with reference to FIG. 5.

In addition, the Normal Title information includes information designating a specific object (OBJ), and data (i.e., AV stream) that is related to the Normal Title is reproduced (or played-back) by using the designated specific object (OBJ). However, the auxiliary Title information does not designate a specific object (OBJ) that is only used for the auxiliary Title information itself. More specifically, for example, the function of the auxiliary Title information is to supplement (or support) the playback of a specific title by using the Normal Title information.

And, finally, the title that is played-back by using the Normal Title information is formed so that playback is performed by using a plurality of objects (OBJ). Among the plurality of objects, only the starting object (e.g., OBJ #2-1 shown in FIG. 3B) is designated by the Normal Title information. However, the auxiliary Title information may also designate the starting object that is linked by the Normal Title information, as well as the subsequent object (e.g., OBJ #2-2 shown in FIG. 3B), which is linked by the starting object. More specifically, for example, the auxiliary Title information includes information designating a random object so as to play-back a specific title, which is played-back by using the Normal Title information, staring from a random point.

As described above, FIG. 3B illustrates the auxiliary Title information included in the index file. Referring to FIG. 3B, Normal Title #2 information of the index file designates a start object (OBJ #2-1), which then designates a subsequent object (OBJ #2-2) in accordance with the hierarchical order. However the auxiliary Title #2 information may also be formed to directly designate the second object (OBJ #2-2) for the Normal Title #2. Eventually, by using the auxiliary Title information, the data being reproduced by the specific title can be reproduced starting from a random point. Conversely, the Normal Title information should be played-back from a playback starting point of the data being reproduced by the Normal Title information. In addition, referring to FIG. 3B, the auxiliary Title #m information of the index file includes designates a second chapter (Chapter 2) of Normal Title #k, and auxiliary Title #m$^{-1}$ information included in the index file designates a third chapter (Chapter 3) of Normal Title #k. More specifically, among a plurality of chapters forming the title a random chapter position is designated as the auxiliary Title information, so as to enable playback to start from the corresponding chapter.

Accordingly, in this detailed description, a "chapter" refers to a title being divided into a plurality of playback units, and the chapter information is provided to the user. Therefore, the user uses a chapter skip-point during the playback of the current title, thereby being able to skip to a different chapter within the current title. More specifically, a change (or shift) of chapter within a title that is currently being played-back (e.g., title #K) can be performed by using the chapter skip-point. And, during the playback of the current title (e.g., title #K), a change in chapter from the current title (e.g., title #K) to a random chapter within another title (e.g., title #K+1, not shown) can be performed by using the auxiliary Title information. However, since the chapter has a different attribute from that of the object, a single object may provide a plurality of chapters. And, alternatively, each of the objects may also provide each chapter. More specifically, the chapter is a set of playback unit information that is provided to the user, and the object is a set of information that is controlled by the system and, thus, cannot be recognized by the user.

Figure 4:
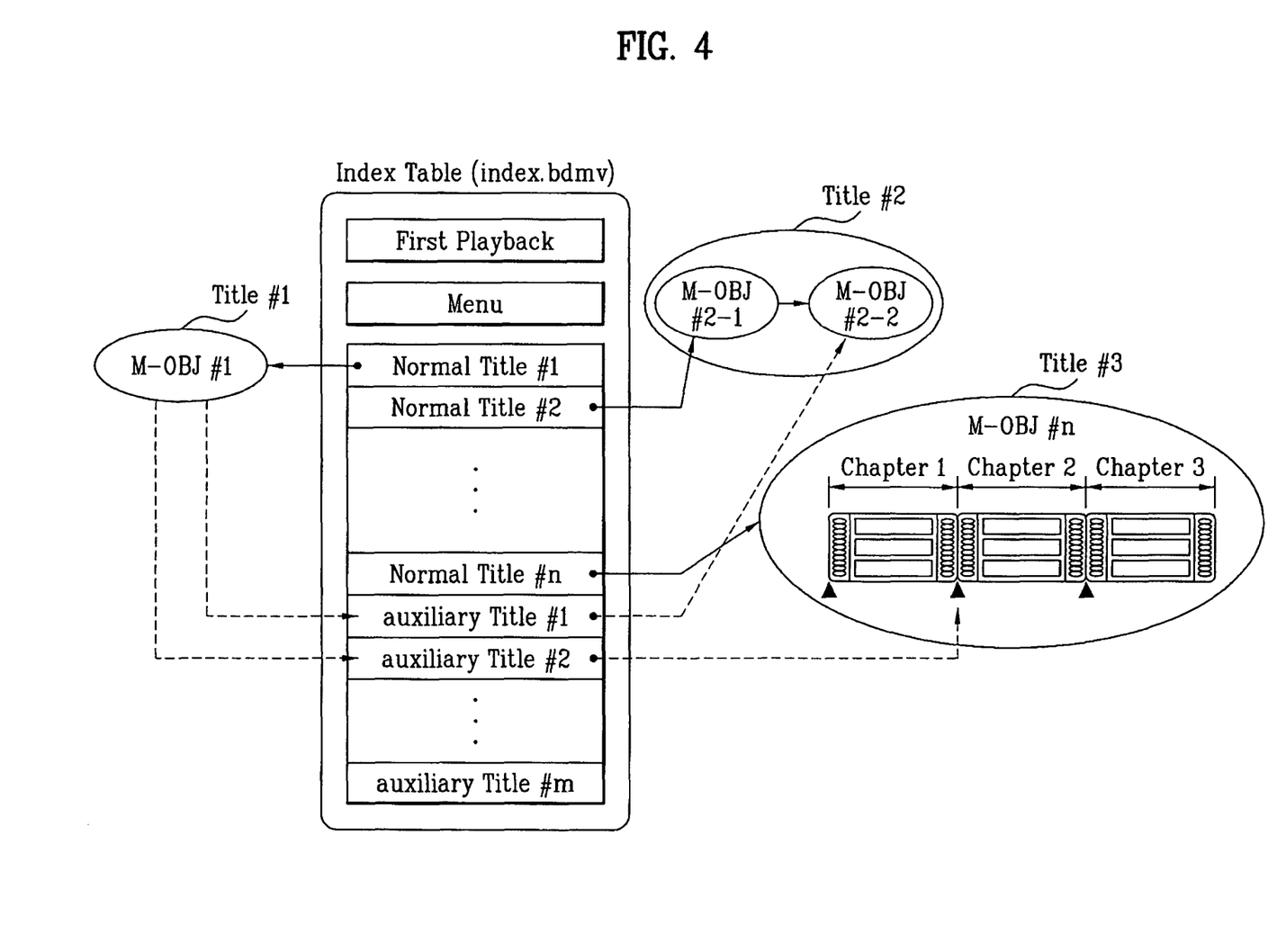
FIG. 4 illustrates a method of playing-back an optical disc file according to a first embodiment of the present invention.
Figure 5:
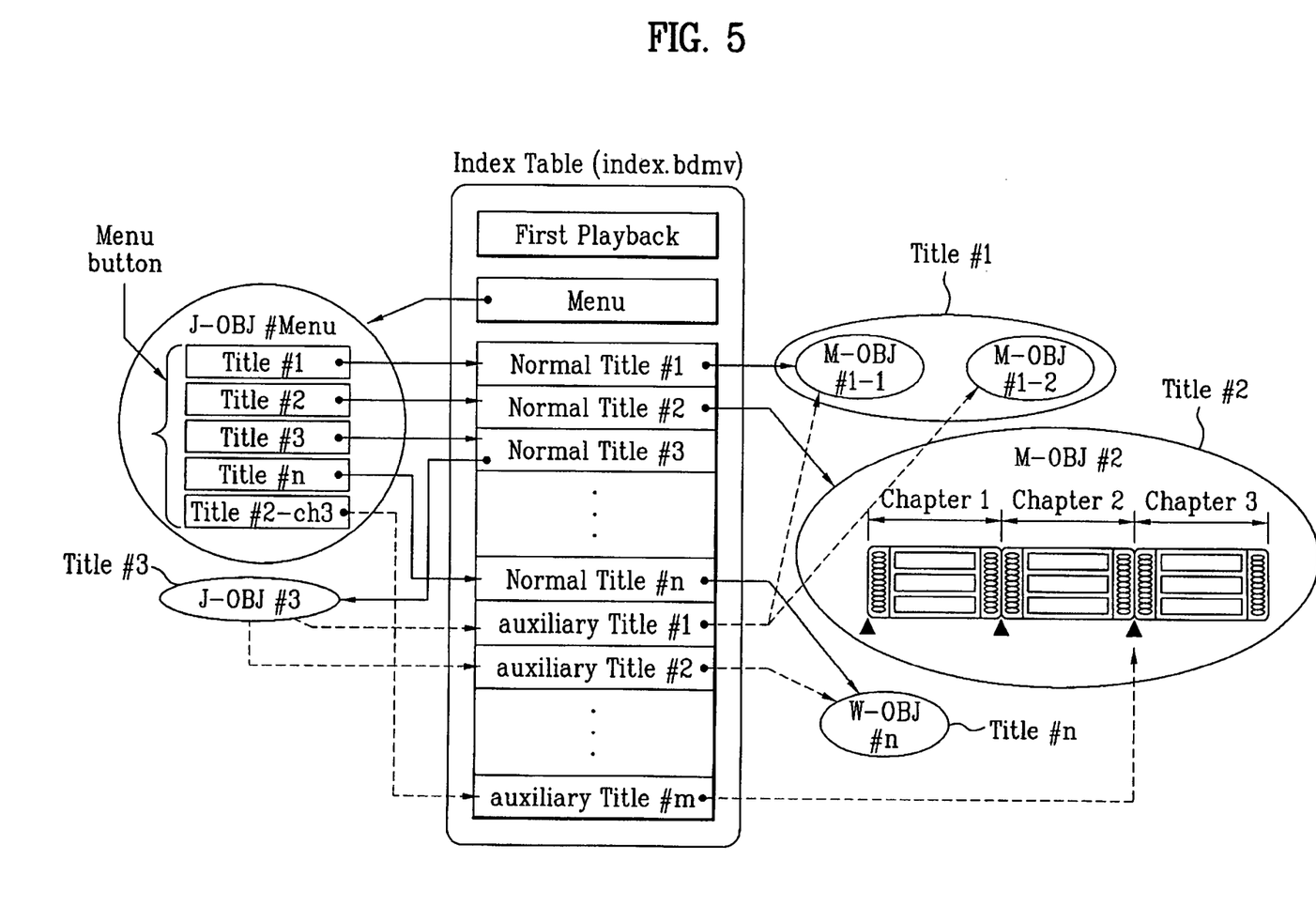
FIG. 5 illustrates a method of playing-back an optical disc file according to a second embodiment of the present invention.

FIGS. 4 and 5 illustrate preferred embodiments of a method of playing-back the optical disc file according to the present invention. Herein, FIG. 4 illustrates an example of using an object mode, and FIG. 5 illustrates an example of using a plurality of object modes, each of which being different from one another. More specifically, FIG. 4 illustrates a method of playing-back an optical disc file according to a first embodiment of the present invention. FIG. 4 illustrates an example of a playback method using the Normal Title information and the auxiliary Title information within the index file, when only a single object mode is included, such as a Movie Object (hereinafter referred to as "M-OBJ") for reproducing an image and a sound.

Referring to FIG. 4, when the user selects Normal Title #1 information, the object designated by the Normal Title #1 information (i.e., M-OBJ #1) is executed. As described above, the object (M-OBJ #1) is programmed by a group of various commands, which generally executes a specific PlayList, so as to perform playback functions of the data (i.e., AV streams) that are related to the title. Furthermore, under specific conditions, the object (M-OBJ #1) may also include a command that designates other objects. For example, when designating a second object (M-OBJ #2-2) among the objects related to Title #2 for playback, while the object (M-OBJ #1) related to Title #1 is executed by using the Normal Title #1 information, the second object (M-OBJ #2-2) can be played-back by using auxiliary Title #1 information, which includes information that corresponds to designating the second object (M-OBJ #2-2).

Moreover, when starting playback from the second chapter (Chapter 2) being related to Title #n, while an object (M-OBJ #1) related to Title #1 is executed by using the Normal Title #1 information, the corresponding chapter (Chapter 2) can be played-back by using auxiliary Title #2 information having information that corresponds to designating the second chapter (Chapter 2). Additionally, when designating and playing-back a first starting object (M-OBJ #1) that is related to the Title #2, while the object (M-OBJ #1) that is related to Title #1 is executed by using the Normal Title #1 information, Title #2 may be played-back starting from the beginning by using the Normal Title #2 information. More specifically, since the first starting object (M-OBJ #2-1) can be directly designated by the Normal Title #2 information, the first starting object (M-OBJ #2-1) is not necessarily required to be designated by using the auxiliary Title information. In other words, during the playback of a current specific title, playback may start from a specific point within a different title by using the auxiliary Title information, more specifically, from a point within the mid-portion of the title, instead of the beginning of the title.

FIG. 5 illustrates a method of playing-back an optical disc file according to a second embodiment of the present invention. More specifically, FIG. 5 illustrates an example of a playback method using the Normal Title information and the auxiliary Title information, when a plurality of object modes is included, for example, when a Movie Object (M-OBJ) reproducing image and sound, a Java Object (hereinafter referred to as "J-OBJ") supplementing interactivity through enhanced data, and a Web Object (hereinafter referred to as "W-OBJ") being played-back as an HTML program, which is broadly used throughout the Internet, are included.

Accordingly, FIG. 5 only proposes an example of a variety of object modes, and another type of mode that is different from the above-described object mode can be formed and used depending upon other preferred embodiments. And, therefore, the usage is not limited to a specific object mode only. Also, as described in the file structure of FIG. 1, when a plurality of object modes is included, the plurality of object modes may be controlled by a single object file (Object.bdmv) or may each be controlled by a separate object file (MovieObject, JavaObject, and WebObject). More specifically, in the second embodiment of the present invention, when a plurality of object modes is provided and in case of playing-back different titles by a change or transition between the object modes, the auxiliary Title information is used so as to facilitate the transition between the object modes.

Referring to FIG. 5, menu information included in an index table designates a Java Object (e.g., J-OBJ #menu), each of Normal Title #1 information and Normal Title #2 information designates a Movie Object (e.g., M-OBJ #1 and M-OBJ #2), Normal Title #3 information designates a Java Object (e.g., J-OBJ #3), and Normal Title #n information designates a Web Object (e.g., W-OBJ #n). In an optical disc having the above-described file structure recorded therein, when a "Menu Call" command is given by a user, a menu screen is displayed by using the Java Object (J-OBJ #menu), thereby allowing the user to select a title (Title #1~Title #n) by using a Menu button displayed on the screen.

Accordingly, a menu button that allows playback to be performed from a mid-portion of a specific title is separately included in the present invention. For example, the user may select playback starting from a specific chapter (e.g., chapter 3) within Title #2 (i.e., Title #2-ch3) by using the menu button. Thus, each of the objects (i.e., M-OBJ #1, M-OBJ #2, J-OBJ #3, and W-OBJ #n) being designated by each of the Normal Title information are performed by a command selected by the user. And, when the user selects a menu button from the menu screen that starts playback from a specific chapter (e.g., chapter 3) within Title #2 (i.e., Title #2-ch3), the specific chapter within Title #2 is designated by auxiliary Title #m information, so as to enable playback to start from the corresponding point.

Also, referring to FIG. 5, when the user selects Normal Title #3 information and when the Java Object (J-OBJ #3) that is selected by the Normal Title #3 information is executed, a transition between object modes can be performed by using the auxiliary Title information. For example, the Movie object (M-OBJ #1-1 or M-OBJ #1-2) that is designated by the Normal Title #1 information can be executed by using the auxiliary Title #1 information, and the Web Object (W-OBJ #n) that is designated by the Normal Title #n information can be executed by the auxiliary Title #2 information. Therefore, in the second embodiment of the present invention, transition may occur between object modes having different data attributes by using the auxiliary Title information.

Figure 6:
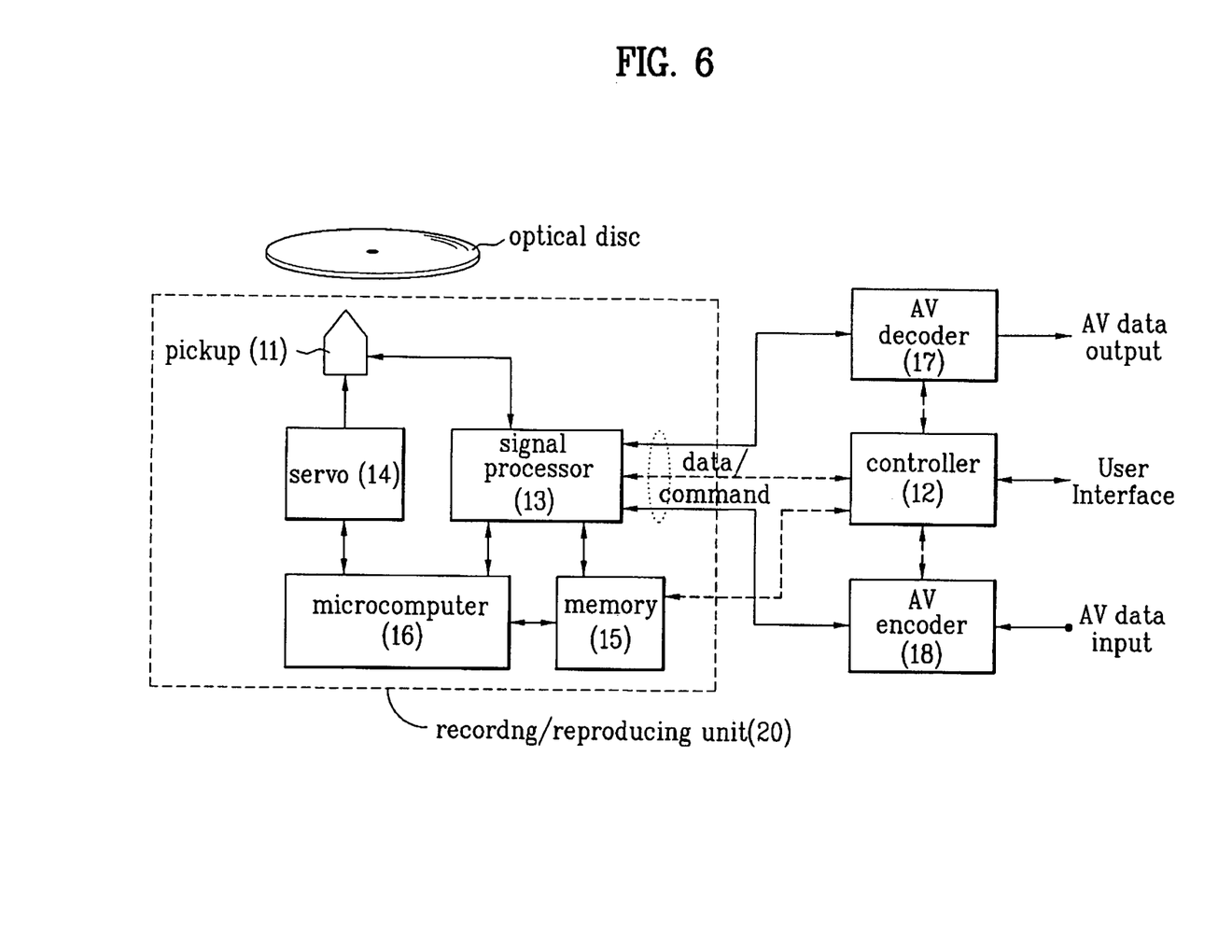
FIG. 6 illustrates an optical recording and/or reproducing apparatus according to the present invention.

FIG. 6 illustrates an optical recording and/or reproducing apparatus according to the present invention. The optical recording and/or reproducing apparatus 10 basically consists of a recording and/or reproducing unit 20, which includes a pick-up unit 11 for reading control information including data and file information recorded within an optical disc, a servo 14 controlling the operations of the pick-up unit 11, a signal processor 13 either recovering the playback signal received from the pick-up unit 11 to a desired signal value, or modulating a signal to be recorded to an optical disc recordable signal and transmitting the modulated signal, a memory 15 temporarily storing and allowing usage of such control information, and a microcomputer 16 controlling the above operations, and a controller 12 transmitting a user command and/or a system command to the recording and/or reproducing unit 20. Furthermore, an AV decoder 17 performs final decoding of output data depending upon the controls of the controller 12. And, in order to perform the function of recording a signal on the optical disc, an AV encoder 18 converts an input signal into a signal of a specific format (e.g., an MPEG-2 transport stream) depending upon the controls of the controller 12 and, then, provides the converted signal to the signal processor 13.

Accordingly, the controller 12 controls the recording and/or reproducing unit 20 and the AV decoder 17, so as to enable the playback of a specific title (e.g., Title #1) that is selected by the user to be performed. Also, while the title (Title #1) is being executed, a set of auxiliary Title information within an index file, which designates a random playback point of another title (Title #2) is used, thereby controlling the recording and/or reproducing unit 20 and the AV decoder 17, so that the playback point is changed (or shifted) to a random point within the other title (Title #2).

As described above, the recording medium, the method of creating a file of the recording medium, and the method and apparatus for reproducing the same have the following advantages. Position change and transition of random playback points among titles recorded within the recording medium can be easily performed, thereby providing to the users an apparatus having more convenient title playback functions.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of reproducing data controlled by a controller operatively coupled to a reproducing unit, the method comprising:
    reading an index file including an index table providing selectable menu and titles, the index table including,
        a first playback information field linked with a first object to be executed automatically before an other object is selected when the recording medium is loaded,
        a first field for a movie title, the first field linked with a movie object for reproducing the movie title, and
        a second field for a Java title that enables playback of another title different from the movie title, the second field linked with a Java object for reproducing the Java title, the Java object being independent of the movie object;
    reading the movie object included in a movie object file, the movie object including a command for launching a playlist;
    reading the Java object included in a Java object file;
    reading the playlist included in a playlist file, the playlist including a playitem identifying a playing interval in a clip; and
    reproducing one of the movie title and the Java title, the Java title being reproduced independent of the movie title.

2. The method of claim 1, wherein the reproducing comprises:
    receiving user input selecting one of the movie title and the Java title; and
    executing one of the movie object file and the Java object file according to the user input.

3. The method of claim 1, wherein the index table further includes a menu information field linked with an object for a menu.

4. A non-transitory recording medium having an executable data structure for managing reproduction of titles by a reproducing apparatus, the non-transitory recording medium comprising:
    a playlist file including a playlist, the playlist including a playitem identifying a playing interval in the clip;
    a movie object file including a movie object for managing reproduction of the movie title, the movie object including a command for launching the playlist;
    a Java object file including a Java object for managing reproduction of a Java title that enables playback of another title different from the movie title, the Java object file being separate from the movie object file, the Java object being independent of the movie object, the Java title being reproduced independent of the movie title; and
    an index file including an index table providing selectable menus and titles, wherein the index table includes,
        a first playback information field linked with a first object to be executed automatically before another object is selected when the recording medium is loaded;
        a first field linked with the movie object; and
        a second field linked with the Java object.

5. The non-transitory recording medium of claim 4, wherein the index table further includes a menu information field linked with an object for a menu.

6. An apparatus for reproducing data, the apparatus comprising:
    a reproducing unit configured to read data from a recording medium; and
    a controller operatively coupled to the reproducing unit and configured to control the reproducing unit to read an index file including an index table providing selectable menu and titles, the index table including,
        a first playback information field linked with a first object to be executed automatically before another object is selected when the recording medium is loaded;
        a first field for a movie title, the first field linked with a movie object for reproducing the movie title, the movie object being included in a movie object file; and a second field for a Java title, the second field linked with a Java object for reproducing the Java title that enables playback of another title different from the movie title, the Java object being included in a Java object file, the movie object file being a separate file from the Java object file, the Java object being independent of the movie object;

the controller configured to control the reproducing unit to, read the movie object, the movie object including a command for launching a playlist, read the Java object, and read the playlist included in a playlist file, the playlist including a playitem identifying a playing interval in a clip; and reproduce one of the movie title and the Java title, the Java title being reproduced independent of the movie title.

7. The apparatus of claim 6, wherein the controller is further configured to receive user input selecting one of the movie title and the Java title, and configured to execute one of the movie object file and the Java object file according to the user input.

8. The apparatus of claim 6, wherein the index table includes a menu information field linked with an object for a menu.

9. The apparatus of claim 6, wherein the controller is further configured to automatically execute the first object linked by the first playback information when the recording medium is loaded.

* * * * *